July 1, 1930.      V. VAN DER LINDE      1,768,723
DISPENSING APPARATUS
Filed April 10, 1928
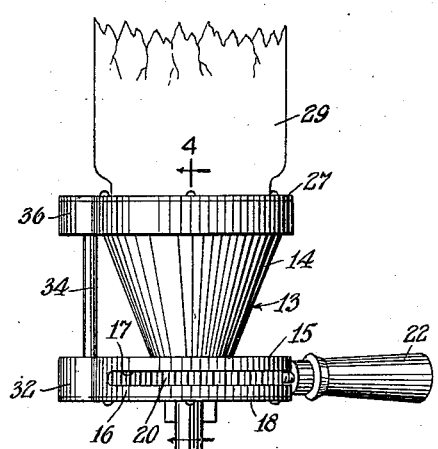
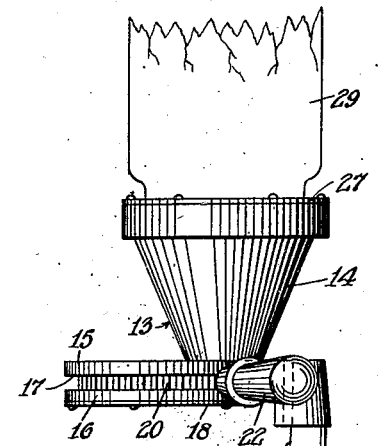
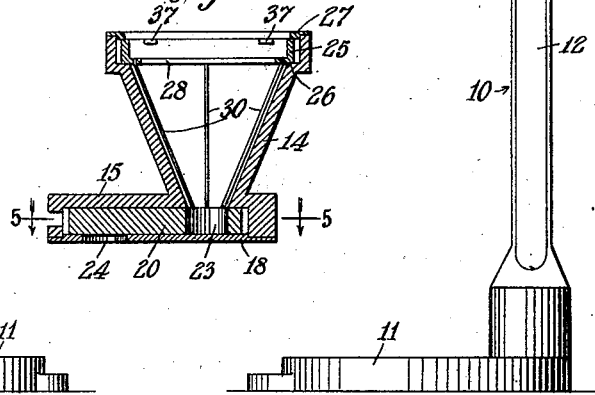
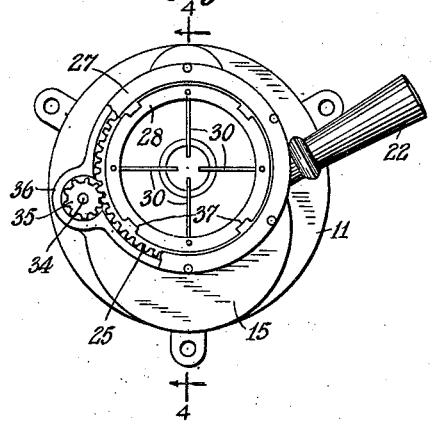
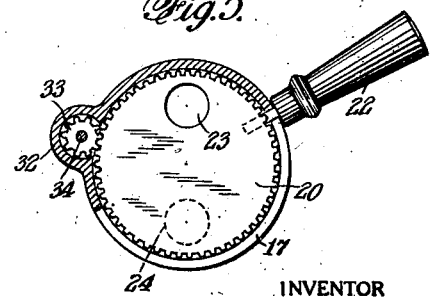
INVENTOR
Victor Van Der Linde
BY
Williams & Morse
ATTORNEY Patented July 1, 1930

1,768,723

UNITED STATES PATENT OFFICE

VICTOR VAN DER LINDE, OF TUCKAHOE, NEW YORK, ASSIGNOR TO FINEART FOODS, INC., OF TUCKAHOE, NEW YORK, A CORPORATION OF DELAWARE

DISPENSING APPARATUS

Application filed April 10, 1928. Serial No. 268,897.

This invention relates to dispensing apparatus particularly adapted for the dispensing of finely divided materials such as coffee and the like in predetermined quantities.

The general object of the invention is to provide a simple device of this character which can be readily actuated, which will accurately measure the portions of material to be dispensed, and wherein a filling hopper is provided having agitating means therein actuated by the movement of the dispensing member through connecting mechanism external to the hopper.

Other objects and advantages of the invention will become apparent from the following description taken in connection with the accompanying drawings in which Figure 1 is a front elevation of a device embodying the invention; Figure 2 is a plan view of the device, with certain parts broken away; Figure 3 is a side elevation of the device as viewed from the right in Figure 1; Figure 4 is a vertical sectional view taken on the line 4—4 of Figures 1 and 2; and Figure 5 is a horizontal sectional view taken on line 5—5 of Figure 4.

Referring to the drawings, the numeral 10 indicates a suitable support which includes a base 11, carrying a bracket 12, to the upper end of which is removably fitted a dispensing unit 13.

The dispensing unit 13 includes a hopper 14, to the lower end of which is connected a cylindrical housing 15, the depending wall 16 of which is formed with a horizontal slot 17 and is provided with a lower cover plate 18. Within the housing 15 is rotatably mounted a gear-toothed measuring and dispensing member or disc 20, the over-all diameter of which is such that the outer ends of its teeth slidably engage the inner surface of the depending wall 16 of the housing 15 with the result that this depending wall serves as a bearing within which the measuring disc is oscillated or partly rotated in reverse directions.

The measuring disc 20 is provided with an operating handle 22, the inner or screw-threaded end of which projects through the horizontal slot 17 and is suitably connected to the measuring disc. The ends of the horizontal slot 17 serve to limit the movement of the measuring disc 20 in opposite directions so that when the handle 22 is moved in one direction to its extreme position, an aperture or charge-receiving pocket 23, formed in the disc, assumes a position in alignment with the discharge opening of the hopper 14, and when the handle is moved in an opposite direction to its extreme position, the pocket 23 is brought into registration with a dispensing opening 24 formed in the cover plate 18. In the former position of the pocket 23, finely divided material to be dispensed falls from the hopper 14 into the pocket and fills it with a measured quantity of such material determined by the capacity of the pocket, and in the latter position of the pocket its contents are permitted to fall by gravity through the dispensing opening 24 of the cover plate and into a suitable receptacle, not shown, such as a cup or the like, which may be supported on the base 11 of the support 10.

Within the hopper 14 is mounted an agitating device, which includes an annular gear-toothed collar 25, seated upon a ledge 26 in the wall of the hopper, the collar 25 being held in position upon the ledge by an annular ring 27 secured to the upper end of the hopper. The collar 25 is formed with an inwardly projecting flange at its lower part which provides a support for a suitable container 29 placed thereon in inverted position and carrying the supply of material to be dispensed. Inwardly extending lugs 37 are provided at the upper part of the annular collar 25 which function to lock the container 29 in its inverted and supported position, and the container is thus carried by a part of the agitating device and is moved therewith and subjected to the oscillating movement in a horizontal plane to which the agitating device is subjected, as will be hereinafter described, and this provides such agitation of the contents of the container as will assure the feeding of all the material therein down into the hopper 14.

Secured to the inwardly projecting flange 28 of the collar 25 and projecting downwardly therefrom in proximity to the inner wall of the hopper 14 are a plurality of stirring or agitating fingers 30, which terminate adjacent to the discharge opening at the bottom of the hopper. These fingers function, as the collar 25 is oscillated through means hereinafter described, to agitate the material within the hopper so as to prevent its clogging and thereby insure complete filling of the pocket 23 with material to be dispensed as such pocket is brought into registration with the lower end or discharge opening of the hopper.

The housing 15 is provided with an off-set portion 32 in which is rotatably mounted a pinion 33, the teeth of which mesh with the teeth of the measuring disc 20. To the pinion 33 is connected a vertical shaft 34, which carries at its upper end another pinion 35, mounted within an off-set portion 36 at the upper part of the hopper 14. The teeth of the upper pinion 35 engage and mesh with the teeth carried on the periphery of the collar 25 so that as the measuring disc 20 is oscillated or partly rotated, the collar 25, carrying the agitating fingers 30, is likewise oscillated. It will be noted that this connecting mechanism is external to the hopper.

In operation, the discharge end of the container 29, carrying the material to be dispensed, is seated upon the flange 28 of the collar 25, and locked against displacement by engagement with lugs 37 of the collar 25. The hopper 14, located beneath the container 29, receives from the container the material to be dispensed and directs the material into the pocket 23 when such pocket is brought into registration with the lower or discharge end of the hopper 14. The material within the pocket 23 is discharged from the apparatus by so moving the handle 22 as to bring the pocket 23 into registration with the dispensing opening 24, whereupon the contents of the pocket are allowed to fall by gravity into a suitable receptacle. As the pocket 23 is moved out of registration with the lower or discharge end of the hopper 14, the solid or imperforated portion of the measuring disc 20 moves under the discharge end of the hopper, thereby closing the hopper and preventing further discharge of its contents until such time as the disc 20 is so rotated as to again bring the pocket 23 into registration with the discharge end of the hopper.

While only one embodiment of the invention is herein shown and described, it will be understood that various changes may be made without departing from the spirit of the invention or the scope of the following claims.

What is claimed is:

1. A dispensing apparatus comprising a hopper having a discharge opening, a movable dispensing member adapted to receive a charge of material from the hopper and thereafter move such charge to dispensing position, a rotatable collar seated upon and journaled within the hopper, agitating fingers carried by the rotatable collar, and gearing external to the hopper operatively connecting the dispensing member with the rotatable collar whereby the rotatable collar and agitating fingers are rotated upon movement of the dispensing member.

2. A dispensing apparatus comprising a hopper having a discharge opening, a movable dispensing member adapted to receive a charge of material from the hopper and thereafter move such charge to dispensing position, a rotatable collar journaled within the hopper, a container for material to be dispensed carried by and movable with the rotatable collar, agitating fingers carried by the rotatable collar, and gearing external to the hopper operatively connecting the dispensing member with the rotatable collar whereby the rotatable collar, agitating fingers, and container are rotated upon movement of the dispensing member.

3. A dispensing apparatus comprising a hopper having a discharge opening, a gear-toothed measuring disc rotatably mounted at the lower end of the hopper, said disc being provided with a charge-receiving pocket adapted to register with the discharge opening of the hopper, an agitating device including a gear-toothed rotatable collar seated upon and journaled within the hopper, gearing external to the hopper operatively connecting said disc with the agitating device, and means for rotating the measuring disc whereby the charge-receiving pocket is moved from charge-receiving position to charge-releasing position and the agitating device is operated.

4. A dispensing apparatus comprising a hopper having a housing at one end and provided with a discharge opening leading into the housing, a gear-toothed measuring disc rotatably mounted within the housing and provided with a pocket adapted to register with the discharge opening of the hopper, an agitating device including a gear-toothed rotatable collar seated upon and journaled within the hopper, gearing external to the hopper operatively connecting the measuring disc with the agitating device, and an operating handle secured to the measuring disc and projecting through the housing for so rotating the measuring disc as to move the pocket thereof into and out of registration with the discharge opening and to operate the agitating device.

5. A dispensing apparatus comprising a hopper having a discharge opening and provided with a housing, a gear-toothed measuring disc rotatably mounted within the housing and provided with a charge-receiving opening adapted to be moved into and out of registration with the discharge opening of the hopper, a cover plate for the housing, said cover plate being provided with a dispensing opening out of alignment with the discharge opening of the hopper, an agitating device including a gear-toothed collar seated upon and rotatably mounted within the hopper, gearing external to the hopper operatively connecting the agitating device with the measuring disc and an operating handle secured to the measuring disc and projecting through the housing for so rotating the measuring disc as to move the charge-receiving opening thereof into registration with the discharge opening of the hopper and the dispensing opening of the cover plate, respectively, and simultaneously effecting the operation of the agitating device.

6. A dispensing apparatus comprising a hopper having a discharge opening and provided with a housing, a measuring disc rotatably mounted within the housing and provided with a charge-receiving opening adapted to be moved into and out of registration with the discharge opening of the hopper, a cover plate for the housing, said cover plate being provided with a dispensing opening out of alignment with the discharge opening of the hopper, a gear-toothed collar journaled in the hopper, agitating fingers carried by said collar and projecting downwardly into the hopper, gearing operatively connecting the measuring disc with said collar and including a shaft and a pair of pinions, and operating means for rotating the measuring disc whereby the charge-receiving opening is moved into registration with the discharge opening of the hopper and the dispensing opening of the cover plate, respectively, and said collar and fingers are simultaneously rotated.

7. A dispensing apparatus comprising a hopper having a discharge opening and provided with a housing, a measuring disc rotatably mounted within the housing and provided with a charge-receiving opening adapted to be moved into and out of registration with the discharge opening of the hopper, a cover plate for the housing, said cover plate being provided with a dispensing opening out of alignment with the discharge opening of the hopper, a gear-toothed collar journaled in the hopper, a container for material to be dispensed carried by and movable with the collar, agitating fingers carried by said collar and projecting downwardly into the hopper, gearing operatively connecting the measuring disc with said collar and including a shaft and a pair of pinions, and operating means for rotating the measuring disc whereby the charge-receiving opening is moved into registration with the discharge opening of the hopper and the dispensing opening of the cover plate respectively and said collar, fingers and container are simultaneously rotated.

In testimony whereof, I have affixed my signature to this specification.

VICTOR VAN DER LINDE.